United States Patent
Cottier et al.

(10) Patent No.: US 6,692,570 B2
(45) Date of Patent: Feb. 17, 2004

(54) SPATTERING APPARATUS

(75) Inventors: John Sydney Cottier, Oatley (AU); Chris Curran, Carlingford (AU); Geoffry Dow, Upper Beaconsfield (AU)

(73) Assignee: James Hardie Research Pty Limited, Rosehill (AU)

( * ) Notice: Subject to any disclaimer, the term of this patent is extended or adjusted under 35 U.S.C. 154(b) by 0 days.

(21) Appl. No.: 10/090,376

(22) Filed: Mar. 4, 2002

(65) Prior Publication Data

US 2003/0070615 A1 Apr. 17, 2003

(30) Foreign Application Priority Data

| Mar. 2, 2001 | (AU) | PR3474 |
|---|---|---|
| Mar. 2, 2001 | (AU) | PR3475 |
| Mar. 2, 2001 | (AU) | PR3476 |
| Mar. 2, 2001 | (AU) | PR3477 |
| Mar. 2, 2001 | (AU) | PR3478 |

(51) Int. Cl.$^7$ ................................ B05C 5/00
(52) U.S. Cl. .................. 118/300; 118/429; 239/219; 239/220
(58) Field of Search .................. 118/429, 300, 118/324, 262, 261, 249, 248, 250, 251; 239/219, 220; 427/429, 424, 256, 428; 101/363, 364

(56) References Cited

U.S. PATENT DOCUMENTS

| 2,987,408 A | 6/1961 | Minnick |
|---|---|---|
| 3,360,392 A | * 12/1967 | Mod et al. .................. 427/256 |
| 3,873,025 A | * 3/1975 | Qvarnstrom ................ 239/220 |
| 4,204,644 A | 5/1980 | Kozuka |
| 4,250,134 A | 2/1981 | Minnick |
| 4,256,584 A | 3/1981 | Lord et al. |
| 4,261,286 A | * 4/1981 | Kupfer ....................... 118/202 |
| 4,268,316 A | 5/1981 | Wills, Jr. |
| 4,403,006 A | 9/1983 | Bruce et al. |
| 4,411,723 A | 10/1983 | Takeuchi |
| 4,818,595 A | 4/1989 | Ellis |
| 4,915,740 A | 4/1990 | Sakai et al. |
| 4,981,740 A | 1/1991 | Larsen |
| 5,032,548 A | 7/1991 | Lowe |
| 5,073,197 A | 12/1991 | Majumdar et al. |
| 5,236,773 A | 8/1993 | Sorathia et al. |
| 5,294,255 A | 3/1994 | Smetana et al. |
| 5,314,119 A | * 5/1994 | Watt ........................... 239/220 |
| 5,383,521 A | 1/1995 | Onan et al. |
| 5,387,283 A | 2/1995 | Kirkpatrick et al. |
| 5,439,518 A | 8/1995 | Francis et al. |
| 5,484,480 A | 1/1996 | Styron |
| 5,490,889 A | 2/1996 | Kirkpatrick et al. |
| 5,536,310 A | 7/1996 | Brook et al. |
| 5,556,458 A | 9/1996 | Brook et al. |
| 5,693,137 A | 12/1997 | Styron |
| 5,853,475 A | 12/1998 | Liskowitz et al. |
| 5,997,632 A | 12/1999 | Styron |
| 6,332,921 B1 | 12/2001 | Brothers et al. |
| 6,346,146 B1 | 2/2002 | Duselis et al. |

FOREIGN PATENT DOCUMENTS

| JP | 60135211 | 7/1985 |
|---|---|---|
| JP | 9201561 | 8/1997 |

* cited by examiner

Primary Examiner—Richard Crispino
Assistant Examiner—Michelle Acevedo Lazor
(74) Attorney, Agent, or Firm—Knobbe, Martens, Olson & Bear, LLP

(57) ABSTRACT

An apparatus (1) for applying a slurry to a substrate (2). The apparatus includes a delivery drum (4) incorporating a delivery surface (5) disposed to support a layer of slurry. A spattering roller (8) is positioned closely adjacent the delivery drum and is rotatable so as to spatter the slurry from the delivery surface onto the substrate. Regulation means selectively vary or interrupt the flow of slurry from the delivery surface onto the substrate.

37 Claims, 4 Drawing Sheets

SPATTERING APPARATUS

FIELD OF THE INVENTION

This application claims priority from the following Australian provisional patent applications, the full contents of which are hereby incorporated by cross-reference.

| Application No. | Title | Date Filed |
| --- | --- | --- |
| PR3474 | A Composite Product | 02 Mar. 2001 |
| PR3475 | Spattering Apparatus | 02 Mar. 2001 |
| PR3476 | Additive For Dewaterable Slurry | 02 Mar. 2001 |
| PR3477 | A Method And Apparatus For Forming A Laminated Sheet Sheet Material By A Spattering | 02 Mar. 2001 |
| PR3478 | Coatings For Building Products | 02 Mar. 2001 |

The present invention relates to an applicator for a fluent substance, and in the preferred form to an apparatus for applying a slurry to a substrate, by spattering.

The invention has been developed primarily for use in relation to the production of fibre reinforced cement (FRC) sheet from cementitious slurry, and will be described primarily with reference to that application. However, it will be appreciated that the invention is not limited to this particular field of use.

BACKGROUND OF THE INVENTION

The following discussion of the prior art is intended to present the invention in an appropriate technical context and allow the significance of it to be properly appreciated. Unless clearly indicated to the contrary, however, reference to any prior art in this specification should not be construed as an admission that such art is widely known or forms part of common general knowledge in the field.

Various apparatus for applying liquids to substrates are known. For example, one process makes use of a spray bar whereby a liquid coating, such as a paint or primer, is squirted and atomised through spaced apart nozzles, so as to coat the substrate which typically passes progressively beneath the spray bar on a conveyor. One problem with devices of this type is that the relatively fine nozzles required to achieve the degree of atomisation necessary for uniform coating are readily clogged, particularly in the case of slurries containing a solid component in suspension. This results in inconsistent application, and requires frequent cleaning which is time consuming, costly and disruptive to the production process. Atomisation is also problematic in the case of more viscous liquids and slurries.

Another known device is a curtain coater, which makes use of a sheet or curtain of flexible fabric material which drapes over the moving substrate and applies a coating by means of a direct wiping action. However, curtain coaters are prone to inconsistent application, are not well suited for use with slurries, are limited in terms of the speed at which they can operate effectively in a production environment, and are not well adapted to applying relatively thick coatings.

Another known form of applicator is usually referred to as a flood coater, which essentially operates by forming a pool of liquid on the substrate, and spreading the pool over the surface with air jets. Again, however, there are limitations with this technique in terms of the uniformity of application, the viscosity of the liquid or slurry that can be used, and the thickness of the layer or coating that can be applied.

Generally, therefore, these known forms of apparatus are subject to a variety of limitations including susceptibility to clogging, inconsistent application, limitations in speed, limitations in the width of sheet material that the coating can be applied to, limitations in the consistency of the liquid or slurry that can be applied, or some combination of one or more of these shortcomings. They are also typically adapted to apply relatively thin outer surface coatings, as distinct from intermediate layers of substantial thickness as part of a laminated sheet. These limitations render such prior art devices generally unsuitable for use in the manufacture of sheet materials, and particularly FRC sheets, of substantial size and at relatively high speed.

Another known form of apparatus is a spatter coater, which makes use of a rotating roller incorporating a radial array of flexible filaments or bristles to spatter a coating onto a substrate. Spatter coaters are used, for example, to apply surface coatings to clay or masonry tiles, on a production line. Spatter coaters are able to some extent to overcome some of the deficiencies of the other known forms of coating apparatus, especially in terms of clogging. However, in the context of the production of sheet material, known spatter coaters are also subject to inherent limitations.

In particular, known spatter coaters are not able accurately to stop and restart the application process on an intermittent basis, in order to permit precisely controlled coating or laminating. This is especially so with the types of slurries typically used in the production of FRC sheet, because of the relatively runny consistency required to ensure "self-levelling", and the consequential tendency for excess slurry to drip onto the substrate, even if the slurry supply is shut off or the spattering roller is temporarily stopped.

This precise control over intermittent stopping and starting of the application process is particularly important in a high speed production environment where different batches of sheets, having different layers, thicknesses or properties, may be required to run back to back through the coating apparatus and inaccurate transitional control can result in patchy application, or the coating for one batch running over into the following batch of product.

A further difficulty arises due to the fact that, in the manufacture of FRC sheet or other products using cementitious slurries, it is desirable not to stop the supply of slurry to the apparatus itself, as this can result in the stagnation or accumulation of slurry in the apparatus or in upstream parts of the process. This, in turn, can result in overflows, changes in slurry consistency or concentration, settling or sedimentation, or undesirable variations in other process parameters.

Known spattering apparatus do not provide for the precise interruption of the slurry application process, and also do not allow for interruption without stopping the supply of slurry to the apparatus. They are therefore not effective in enabling an accurately controlled intermittent application process, especially in a high speed production environment for sheet materials.

It is an object of the present invention to overcome or ameliorate one or more of the disadvantages of the prior art, or at least to provide a useful alternative.

SUMMARY OF THE INVENTION

Accordingly, the invention provides an apparatus for applying a slurry to a substrate, the apparatus including:
 a delivery surface disposed to support a layer of slurry;
 spattering means adapted to be positioned closely adjacent the delivery surface and being movable so as to spatter the slurry from the delivery surface onto the substrate; and regulation means for selectively varying or interrupting the flow of slurry from the delivery surface onto the substrate.

The terms "spatter", "spattering" and the like as used herein, are intended to encompass any application technique whereby the slurry is deposited onto a surface or substrate in droplet, globule, particulate or atomised form, whether produced by brushing, flicking, rotating, spraying, agitating, atomising or other dispersion means, and whether propelled by mechanical, electrostatic, hydrostatic, hydrodynamic, gravitational or other means.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Preferably, the apparatus includes a reservoir to contain slurry upstream of the regulation means. Preferably, the reservoir includes an inlet to direct slurry from a supply source and an outlet associated with the regulation means.

The regulation means preferably include a pair of barrier elements selectively movable to define an intermediate clearance space of variable effective cross-sectional flow area, thereby to permit selective regulation of the flow rate of slurry from the reservoir, between the barrier elements, through the outlet, to the delivery surface. Preferably, the barrier elements are selectively adapted, in a closed configuration, to shut off flow between the reservoir and the delivery surface.

Preferably, one of the barrier elements comprises a first cylindrical roller rotatable about a first axis. The other of the barrier elements is preferably a second cylindrical roller rotatable about a second axis, parallel to the first. The rollers are preferably configured to rotate in opposite directions.

The first roller preferably takes the form of a delivery drum, the outer surface of which constitutes the delivery surface. The second roller preferably takes the form of a metering roller selectively movable toward, and away from, the delivery drum.

The apparatus preferably includes a main frame supporting the delivery drum, and a first sub-frame on which the metering roller is mounted, the first sub-frame being rotatable about a third axis parallel to, and spaced from, the second axis, thereby adjustably to displace the metering roller towards, and away from, the delivery drum while maintaining a parallel orientation between them.

In one preferred embodiment, the apparatus includes first hydraulic or pneumatic actuation means extending between the main frame and the first sub-frame for adjustably moving the metering roller and the delivery drum toward or away from each other.

Preferably, the spattering means include a plurality of resiliently flexible elongate spattering elements in the form of bristles, extending radially outwardly from a cylindrical body rotatable about a fourth parallel axis. The body and spattering elements together preferably form a spattering roller.

The apparatus preferably further includes a second sub-frame on which the spattering roller is mounted, the second sub-frame being rotatable about a fifth axis substantially parallel to, and spaced apart from, the fourth axis. A second actuator preferably extends between the main frame and the second sub-frame to effect independently adjustable displacement of the spattering roller towards, and away from, the delivery drum, so as to permit selective variation or interruption of the spattering process, as part of the regulation means.

Preferably, the apparatus further includes a tank for containing a supply of the slurry and a delivery conduit for delivering the slurry from the tank to the reservoir through the inlet.

In one embodiment, the reservoir is defined by a tank positioned immediately above the delivery and metering rollers. In an alternative embodiment, the reservoir is simply a containment region defined between adjacent rollers, preferably the delivery roller and an abutting idler roller, with the metering roller being positioned above the delivery roller.

In a preferred embodiment, the slurry is a cementitious slurry and more preferably, is formed from a mixture of silica, cement, water and optionally other additives.

The apparatus is particularly suitable for applying aesthetic or functional coating layer to an existing substrate. In one embodiment, the slurry is a self levelling dewaterable cementitious slurry with a solids content of between 50% and around 90%. The slurry preferably includes a dewatering aid in a sufficient quantity to permit dewatering of the slurry, preferably through the substrate with or without vacuum assistance.

BRIEF DESCRIPTION OF THE DRAWINGS

Preferred embodiments of the invention will now be described, by way of example only, with reference to the accompanying drawing in which.

PREFERRED EMBODIMENTS OF THE INVENTION

Figure 1:
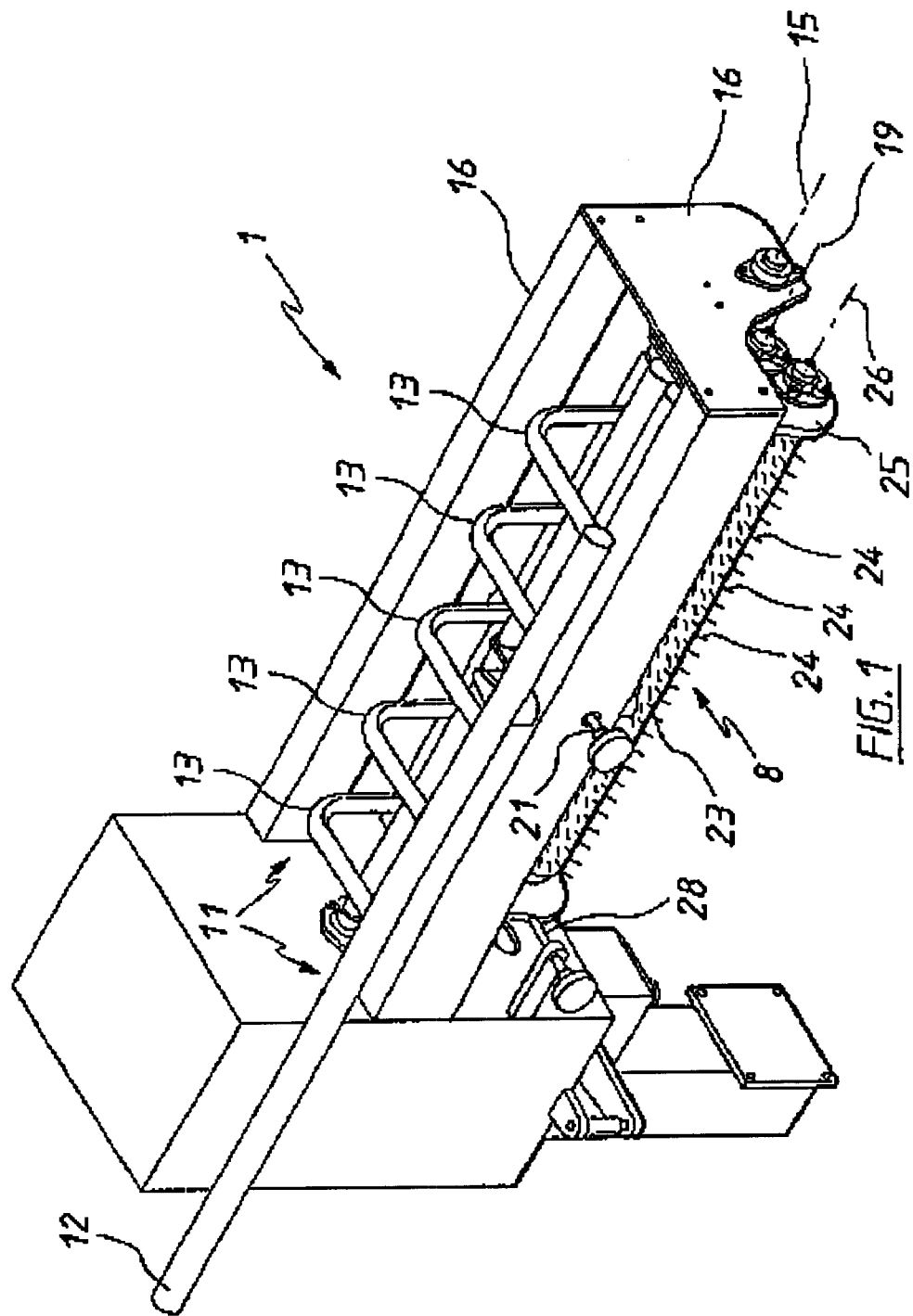
FIG. 1 is a perspective view of an apparatus in accordance with the invention.
Figure 2:
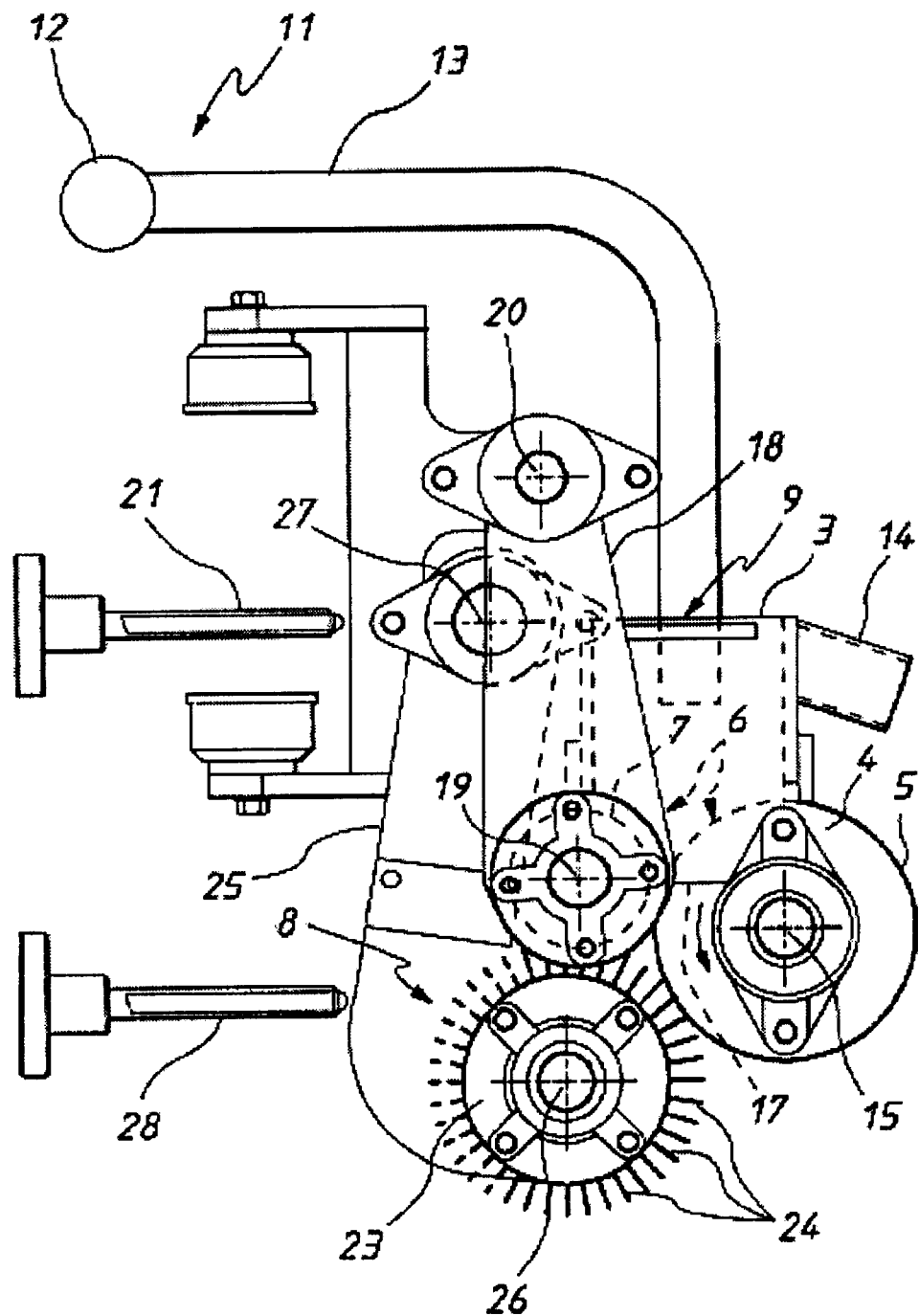
FIG. 2 is a diagrammatic side elevation of the apparatus of FIG. 1.
Figure 3:
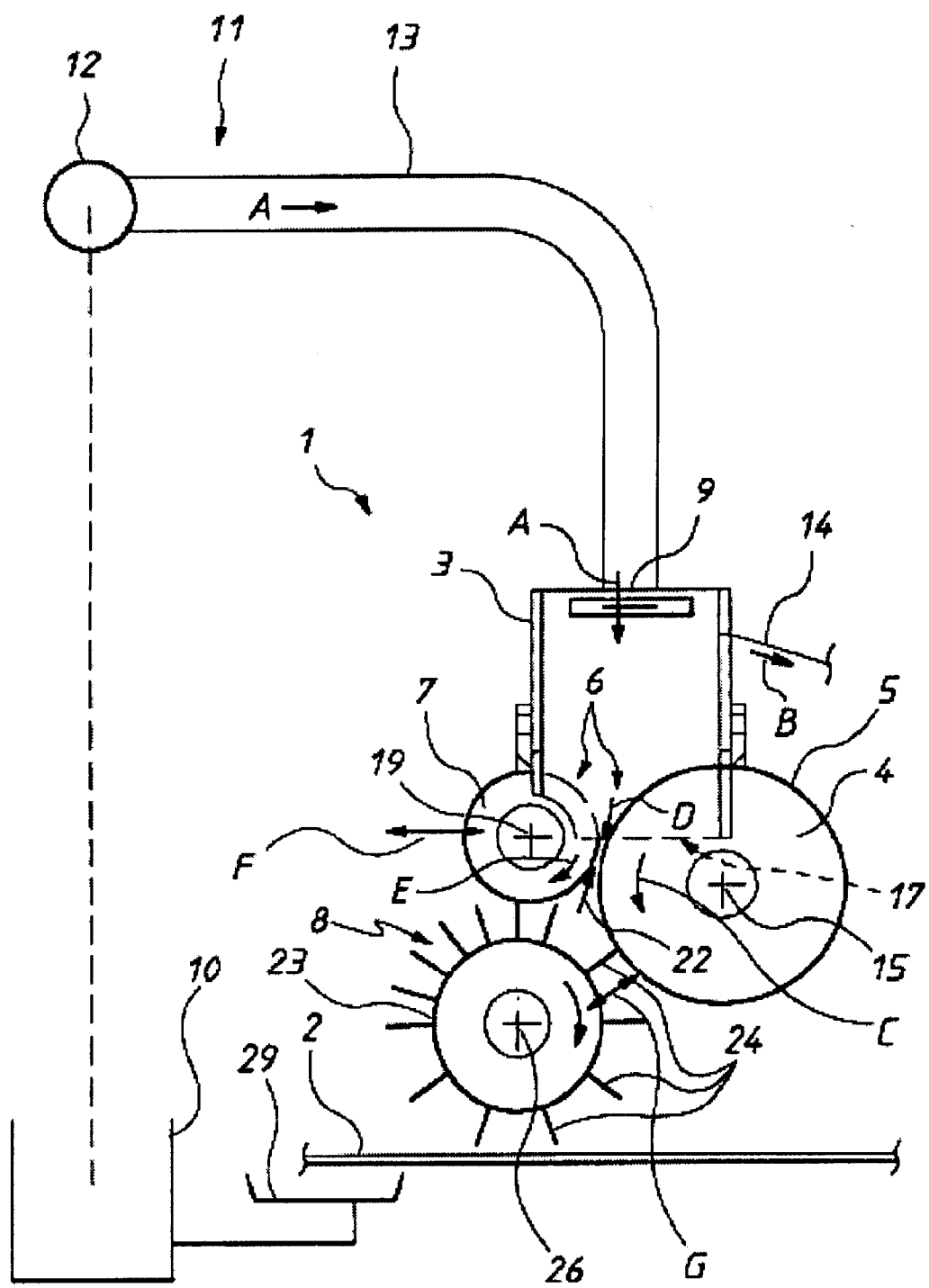
FIG. 3 is a schematic side elevation of the apparatus of FIG. 1.

Referring initially to FIGS. 1 to 3, the invention provides an apparatus 1 for applying a cementitious slurry to a substrate 2 in the form of a laminated sheet material in the process of being manufactured. In broad terms, the apparatus 1 includes an elongate reservoir 3 for containing the slurry, and a delivery drum 4 having an outer delivery surface 5 for supporting an adherent layer of the slurry from the reservoir by surface tension. Regulating means 6 including a cylindrical metering roller 7 are adapted to selectively regulate the flow rate of slurry from the reservoir to the delivery surface, and a spattering roller 8 is disposed to spatter the slurry from the delivery surface onto the substrate. These features of the invention are described in more detail below.

At the top of the reservoir 3, there are a number of inlets 9 to direct slurry from a supply source in the form of a five hundred litre main slurry holding tank 10 (see FIG. 3) positioned below the level of the apparatus. The slurry is delivered by a pump (not shown) to the reservoir from the main tank via a manifold 11. The manifold includes a header pipe 12 in fluid communication with the main tank 10, and a number of parallel delivery pipes 13 leading from the header pipe, through the inlets 9, into the reservoir to deliver the slurry as indicated by arrows A in FIG. 3. An overflow pipe 14 is connected between the reservoir and the main tank for recirculating slurry above a predetermined level in the reservoir back to the tank, as indicated by arrow B, to prevent overflow.

The delivery drum 4 is essentially a cylindrical roller mounted for rotation in a direction indicated by arrow C, about a first axis 15 on a main frame 16. The drum 4 is disposed below the reservoir and is parallel to but longitudinally offset relative to the centre line of the reservoir. The drum is disposed under an outlet 17 of the reservoir, and is therefore in the path of slurry flowing downwardly from the reservoir, as indicated by arrow D. Thus, slurry from the reservoir flows directly onto the delivery surface 5.

The delivery drum 4 operates in conjunction with the metering roller 7 to define the outlet and to form part of the regulation means 6 referred to above. The metering roller 7 is mounted on a first sub-frame 18 for rotation, in a direction indicated by arrow E, about a second axis 19 which is parallel to the first axis 15. The sub-frame 18, in turn, is mounted on the main frame 16 for rotation about a third axis 20 which is parallel to the second axis 19. The delivery drum and the metering roller are rotationally driven in opposite directions by a motor, via a chain drive assembly (not shown). Both the delivery drum and the metering roller are plated with chrome to provide the desired surface hardness. In alternative embodiments, however, the drum and roller may be additionally or alternatively coated with polyurethane, carbide, or other suitable surface coatings, treatments or finishes.

An actuation mechanism including a ram 21 is provided for adjustably rotating the first sub-frame 18 so that the metering roller 7 moves towards, or away from, the delivery drum, as indicted by arrow F. It will therefore be appreciated that the delivery drum and the metering roller serve as a pair of barrier elements, adjustably defining an intermediate clearance space 22 for channelling or blocking the flow of slurry from the reservoir to the surface of the delivery drum. Thus, movement of the metering roller towards, or away from, the delivery drum varies the effective cross-sectional area of the clearance space 22, and this movement therefore regulates the flow rate of the slurry onto the delivery surface. In the embodiment shown, the ram 21 includes a screw and is actuated by rotation. In other embodiments (not shown), the ram may pneumatic or hydraulic.

The spattering roller 8 includes a cylindrical body 23 and a plurality of resiliently flexible elongate spattering elements in the form of bristles 24 which extend radially outwardly from the body. The spattering roller is mounted on a second sub-frame 25 for rotation about a fourth axis 26, parallel to the other axes. The second sub-frame 25, in turn, is mounted on the main frame 16 for rotation about a fifth parallel axis 27. A second ram 28, is provided for rotating the second sub-frame 25 about its axis 27, and hence for adjustably moving the spattering roller 8 towards, or away from, the delivery drum 4 as indicated by arrow G. The spattering roller 8 is rotationally driven by a motor via a V-belt and pulley assembly (not shown).

An overflow sump 29 is provided at the bottom of the apparatus and is positioned to catch overflow slurry from the reservoir, which falls from or between the metering roller and delivery drum, without being picked up by the spattering roller 8.

In use, the apparatus is disposed across a conveyer (not shown) which forms part of a production line for sheeting to be formed from, or incorporate, a layer of material formed from the slurry. The sheet may or may not be fibrous and laminated. However, it is envisaged that the invention will ideally be used in relation to the manufacture of laminated fibre reinforced cement (FRC) sheet and in that context, may be incorporated into the known "Hatschek" process.

As the sheet passes beneath on the conveyer, the apparatus is activated and slurry is permitted to flow downwardly from the reservoir onto the rotating delivery drum 4. The spattering roller 8 also rotates whereby the bristles 24 are dragged over the delivery drum, to collect slurry from the layer formed on the delivery surface of the drum. When the bristles move clear of the delivery drum, they flick the slurry and spatter it onto the sheet below, to apply a relatively uniform layer of slurry.

The distance between the metering roller and the counter-rotating delivery drum determines the effective cross-sectional flow area of the intermediate clearance space 22 and hence the flow rate of the slurry onto the drum. This, in turn, determines the thickness of the layer of slurry formed on the delivery surface which also affects the rate of spattering of the slurry by the spattering roller. This thickness can be adjusted as desired by means of the ram 21 to be appropriate for the particular formulation of slurry being used, to achieve the desired thickness of the spattered layer.

In addition to adjusting the cross-sectional area of the clearance space 22, the spattering characteristics can also be varied by moving the spattering roller 8 towards, or away from, the delivery drum using the second ram 28. This varies the extent to which the bristles penetrate the slurry layer on the delivery surface, pressure of the bristles 24 on the delivery surface, and the extent of resilient deformation of the bristles to provide an added dimension of control. Further adjustment and control can be achieved by varying the speed of the spattering roller, both in absolute terms and relative to the delivery roller. By altering these various operational parameters which also broadly constitute aspects of the regulation means, different thicknesses, up to around 10 mm or more, can be achieved in single, intermediate or surface layers. Different surface finishes such as orange peel, stucco and the like can also be achieved.

The second sub-frame 25 is capable of rotating sufficiently about its axis 27 to allow the spattering roller to move well clear of the delivery drum. This enables accurate stopping and starting of the application process as described in more detail below, as well as facilitating cleaning and maintenance of the spattering roller and the drum.

It will be appreciated that some of the slurry flowing from the reservoir lands on, and is carried round by, the metering roller 7 rather than the delivery drum. This slurry, as well as other slurry passing through the outlet which is not picked up by the spattering roller, falls from the metering roller as overflow into the sump 29, from where it is fed, by gravity, back to the supply tank 10.

One embodiment of the apparatus is adapted to be used on a production line on which sheets having different characteristics and constituent layers are produced in quick succession. Consequently, it is necessary to be able to pause and restart the spattering process, and adjust the slurry flow rate, rapidly and accurately to prevent a carry-over of the spattering conditions in respect of one type of sheet to the type of sheet passing along the production line.

To this end, adjustment of the flow rate is achieved by moving the metering roller relative to the delivery drum, so as to adjust the intermediate clearance space 22. To temporarily stop the spattering process, the spattering roller is intermittently moved away from the delivery roller. In this way, the spattering roller also forms part of the flow regulation means. Additionally or alternatively, the metering roller may simply be moved until it abuts the delivery drum directly, so as to completely close the clearance space 22, thereby cutting off the supply of slurry to the deliver surface, through the associated outlet.

During this process, it is desirable not to stop or reduce the rate of delivery of slurry from the main supply tank 10 to the reservoir 3, as this may have disadvantageous consequences including overflows, changes in slurry consistency or concentration, settling or sedimentation, upsetting of other process parameters, or clogging of piping which in turn may interrupt the production process, and necessitate labour-intensive maintenance and cleaning operations. Accordingly, when the spattering process is paused, resulting in the flow rate of slurry from the reservoir being reduced or stopping completely, the level of slurry in the reservoir may increase. Once it reaches the level of the overflow pipe 14, the overflow slurry is returned through this pipe back to the main tank. Thus, in pause mode, the slurry continues to circulate between the tank and the reservoir, to prevent settling, clogging or overflowing until delivery resumes.

Figure 4:
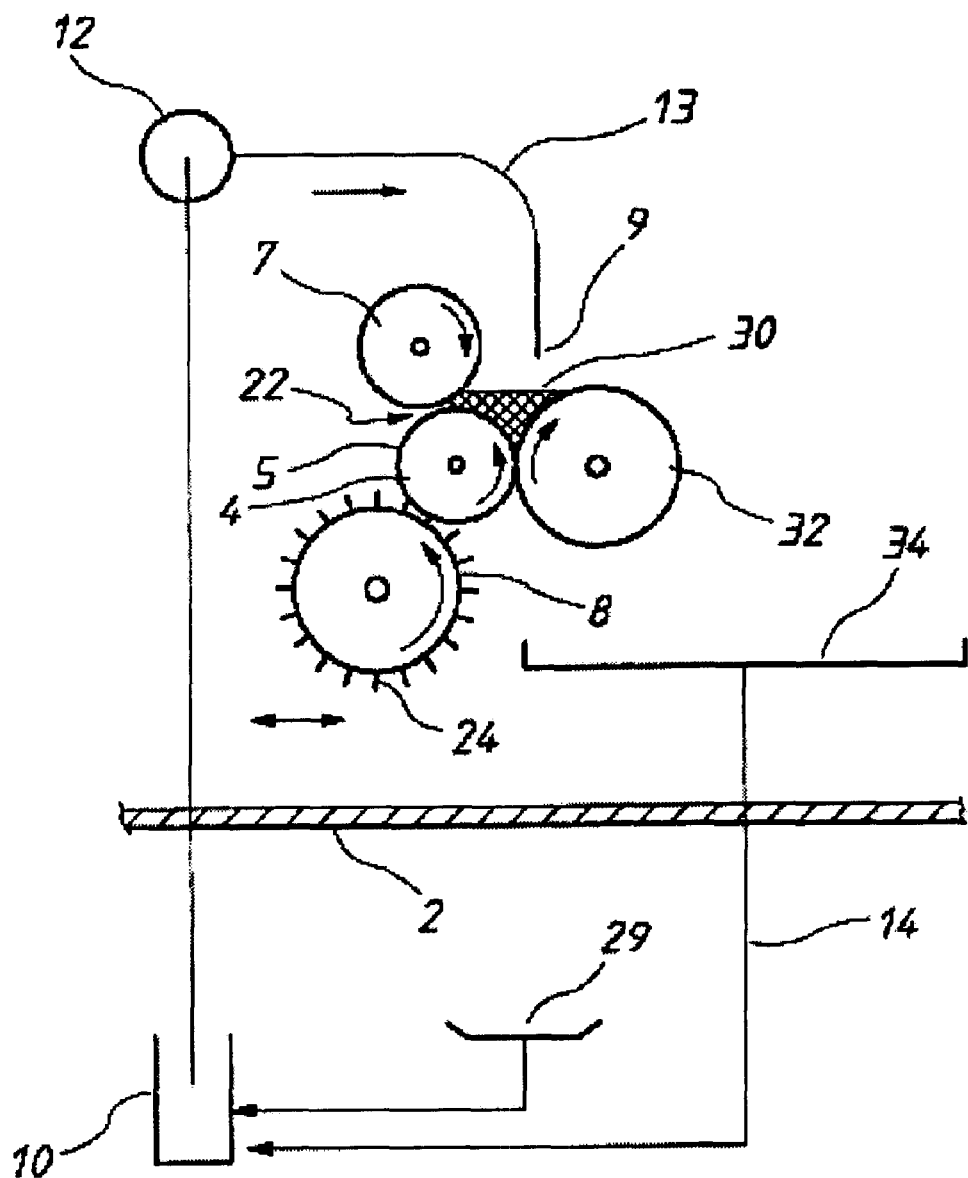
FIG. 4 is a schematic, side elevation showing an alternative embodiment of the invention.

FIG. 4 is a schematic view showing a further embodiment of the invention, wherein corresponding features are denoted by corresponding reference numerals. In this case, a separate tank for the reservoir is not used. Rather, the reservoir simply takes the form of an open topped containment region 30 defined between the delivery roller 4 and an adjacent idler roller 32 positioned in rolling contact, and in side by side relationship, with respect to the delivery roller. The idler roller is coated with polyurethane and is not driven. The height and diameter of the idler roller are configured such that the slurry in the containment region flows naturally into the clearance space 22 between the delivery roller 4 and the metering roller 7, which in this embodiment is positioned immediately above the delivery roller. An additional collection tray 34 is provided to collect any slurry dripping from the idler roller, and feed it back to the main tank 10 via the overflow conduit 14 for recirculation. In most other respects, this embodiment functions in essentially the same way as that previously described.

The apparatus may be positioned at any desired point along the process line, and may be selectively operated on an intermittent basis at any desired time in the process, in order to position the spattered layer or layers appropriately. For example, the spattered layer may be initially applied to the belt as a first layer of film, so as to form what will ultimately be an outer layer of the finished sheet. This may be done, for example, in a case where the outer spattered layer will comprise a softer formulation to facilitate sanding and finishing, a coloured formulation for branding or to obviate the need for painting, or a textured layer to achieve a desired aesthetic effect. The same considerations might apply in the case where the spattered layer is the final layer in which case, again, it will form an outer face of the finished sheet. Alternatively, the spattered slurry may be applied at an intermediate stage to form an internal layer. This may be done, for example, in the case of a fire retardant layer, a moisture barrier layer, or a layer added for structural purposes, where surface finish or aesthetic considerations are not directly relevant. It should also be appreciated that the entire sheet may be formed by spattering, either as a single uniform layer, or from multiple spattered layers of the same or different composition. In this context, it will further be appreciated that a series of the spattering devices may be positioned in sequence along a process line using either the same or different slurry formulations. It should also be understood that the sheet material may include layers formed previously or simultaneously by other processes. Furthermore, the apparatus may be used to apply a paint primer, render, sealant or other surface coating, whether cementitious in composition or otherwise.

The invention provides an effective and efficient method and apparatus for producing sheet material. In its preferred application in the manufacture of FRC, it provides a means of accurately producing a laminated sheet material which can be readily tailored and optimised in order to achieve a wide variety of performance and aesthetic characteristics. The apparatus also allows the application characteristics to be readily altered, providing a considerable degree of flexibility to produce a range of different products, including laminated products, on an effectively continuous basis, with minimum set up time between runs. In all these respects, the invention represents a practical and commercially significant improvement over the prior art.

Although the invention has been described with reference to specific embodiments it will be appreciated by those skilled in the art that it may be embodied in many other forms. In particular, it will be appreciated that the method and apparatus of the present invention may be adapted for use in conjunction with the composite product, additive for dewaterable slurry, and coatings for building products as described in the various priority documents.

What is claimed is:

1. An apparatus for applying a slurry to a substrate, the apparatus including:

a delivery surface disposed to support a layer of slurry;

spattering means adapted to be positioned closely adjacent the delivery surface and being movable so as to spatter the slurry from the delivery surface onto the substrate;

recirculation means for allowing continuous flow of slurry upstream of the delivery surface; and regulation means for selectively varying or interrupting the flow of slurry from the delivery surface onto the substrate without interrupting the flow of slurry upstream of the delivery surface wherein the regulation means include a pair of barrier elements selectively movable to define an intermediate clearance space of variable effective cross-sectional flow area to thereby permit selective regulation of the flow rate of slurry from a reservoir, between the barrier elements, through an outlet, and to the delivery surface, the barrier elements being selectively adapted, in a closed configuration, to shut off flow between the reservoir and the delivery surface, a first barrier element comprising a delivery drum rotatable about a first axis and having an outer surface constituting the delivery surface, and a second barrier element comprising a metering roller rotatable about a second axis, parallel to the first axis, and selectively movable toward and away from the delivery drum, the delivery drum and the metering roller configured to rotate in opposite directions;

a main frame supporting the delivery drum, and first sub-frame on which the metering roller is mounted, the first sub-frame being rotatable about a third axis parallel to and spaced apart from the second axis, to selectively displace the metering roller towards, and away from, the delivery drum while maintaining a parallel orientation therebetween.

2. An apparatus according to claim 1, wherein the reservoir is upstream of the regulation means.

3. An apparatus according to claim 2, wherein the reservoir includes an inlet to direct slurry from a supply source and an outlet associated with the regulation means.

4. An apparatus according to claim 1, further including first actuation means extending effectively between the main frame and the first sub-frame for adjustably moving the metering roller and the delivery drum toward or away from each other.

5. An apparatus according to claim 4, wherein the first actuation means include a hydraulic or pneumatic cylinder.

6. An apparatus according to claim 1, wherein the spattering means include a plurality of resiliently flexible elongate spattering elements in the form of bristles, extending radially outwardly from a cylindrical body rotatable about a fourth axis.

7. An apparatus according to claim 6, wherein the fourth axis is generally parallel to the first, second and third axes.

8. An apparatus according to claim 6, wherein the body and the spattering elements together form a spattering roller.

9. An apparatus according to claim 8, further including a second sub-frame on which the spattering roller is mounted, the second sub-frame being rotatable about a fifth axis substantially parallel to, and spaced apart from, the fourth axis.

10. An apparatus according to claim 9, wherein second actuation means extend effectively between the main frame and the second sub-frame to effect independently adjustable displacement of the spattering roller towards, and away from, the delivery drum, so as to permit selective variation or interruption of the spattering process, as part of the regulation means.

11. An apparatus according to claim 10, wherein the second actuation means include a hydraulic or pneumatic cylinder.

12. An apparatus according to claim 1, further including a tank for containing a supply of the slurry and a delivery conduit for delivering the slurry from the tank to the reservoir through the inlet.

13. An apparatus according to claim 12, wherein the reservoir is defined by a tank positioned immediately above the delivery drum and the metering roller.

14. An apparatus according to claim 12, wherein the reservoir comprises a containment region defined between adjacent rollers.

15. An apparatus according to claim 14, wherein the containment region is defined between the delivery drum and an abutting idler roller, with the metering roller being positioned above the delivery roller.

16. An apparatus according to claim 1, being adapted for use with a cementitious slurry formed from a mixture of silica, cement, water and optionally other additives.

17. An apparatus according to claim 16, wherein the cementitious slurry is a self levelling dewaterable slurry with a solids content of between 50% and around 90%.

18. An apparatus according to claim 17, being adapted for use with a slurry including a dewatering aid in sufficient quantity to permit dewatering of the slurry, through an underlying substrate.

19. An apparatus for applying a liquid to a substrate, comprising:
a delivery drum rotatably mounted along a first axis;
a metering roller rotatably mounted having an axis parallel to and offset with respect to the first axis, the delivery drum and metering roller defining a clearance space therebetween;
a spattering roller rotatably mounted having an axis parallel and offset with respect to the first axis and disposed downstream from said clearance apace;
a source of liquid upstream from said clearance space and in communication with the clearance space, the source of liquid being disposed above the delivery drum and metering roller; and
wherein the metering roller is configured to move toward the delivery drum to stop the flow of liquid through the clearance space and away from the delivery drum to vary the clearance space thereby regulating the flow rate of the liquid therethrough.

20. The apparatus of claim 19, wherein the spattering roller is configured with a plurality of bristles and is further configured to move toward or away from the delivery drum.

21. The apparatus of claim 19, further comprising a recirculating flow path from a tank, to the clearance space, and back to the tank.

22. The apparatus of claim 21, wherein the recirculating flow path is configured to continuously circulate the liquid.

23. The apparatus of claim 21, further comprising an overflow sump configured to catch overflow liquid and return it to the tank.

24. The apparatus of claim 19, wherein the liquid is a cementitious slurry.

25. The apparatus of claim 19, wherein the source of liquid is located within a containment region defined by the delivery drum, the metering roller and an idler roller.

26. An apparatus for applying a slurry to a substrate, the apparatus comprising:
a delivery surface disposed to support a layer of slurry;
a spattering roller adapted to be positioned closely adjacent the delivery surface and being movable so as to spatter the slurry from the delivery surface onto the substrate;
a recirculation pathway configured to continuously circulate a flow of slurry upstream of the delivery surface;
a regulator configured to selectively vary or interrupt the flow of slurry from the delivery surface onto the substrate without interrupting the flow of slurry upstream of the delivery surface;
a reservoir to contain slurry upstream of the regulator, the reservoir defined by a tank positioned immediately above the clearance space; and
wherein the regulator comprises a pair of barrier elements selectively movable to define a clearance space of varying cross-sectional flow area to thereby permit selective regulation of the flow rate of slurry from the reservoir, between the barrier elements, and to the delivery surface.

27. The apparatus of claim 26, wherein the barrier elements are configured to selectively abut one another to shut of flow between the reservoir and the delivery surface.

28. The apparatus of claim 26, wherein at least one of the barrier elements is a roller mounted for rotation.

29. The apparatus of claim 26, wherein the spattering roller is configured to selectively move toward or away from the delivery surface.

30. An apparatus for applying a liquid to a substrate, comprising:
a delivery drum rotatably mounted along a first axis;
a metering roller rotatably mounted having an axis parallel to and offset with respect to the first axis, the delivery drum and metering roller defining a clearance space therebetween;
a spattering roller rotatably mounted having an axis parallel and offset with respect to the first axis and disposed downstream from said clearance space; and
a source of liquid located within a containment region defined by the delivery drum and, the metering roller and an idler roller.

31. The apparatus of claim 30, wherein the spattering roller is configured with bristles and is positioned such that the bristles contact the delivery drum.

32. The apparatus of claim 31, wherein the spattering roller is configured to move toward or away from the delivery drum.

33. An apparatus for applying a liquid to a substrate, comprising:

a delivery drum rotatably mounted along a first axis;

a metering roller rotatably mounted having an axis parallel to and offset with respect to the first axis, the delivery drum and metering roller defining a clearance space therebetween;

a spattering roller rotatably mounted having an axis parallel to and offset with respect to the first axis and disposed downstream from said clearance space;

a source of liquid upstream from said clearance space and in communication with the clearance space;

wherein the metering roller is configured to move toward the delivery drum to stop the flow of liquid through the clearance space and away from the delivery drum to vary the clearance space thereby regulating the flow rate of the liquid therethrough; and wherein the spattering roller is configured with a plurality of bristles and is further configured to move toward or away from the delivery drum.

34. The apparatus of claim 33, wherein at least one of the metering roller and the delivery drum are configured to move toward or away from the other to thereby selectively vary the clearance space.

35. The apparatus of claim 34, wherein the clearance space has a minimum distance of substantially zero to thereby inhibit liquid flow therethrough.

36. An apparatus for applying a slurry to a substrate, the apparatus comprising:

a delivery surface disposed to support a layer of slurry;

spattering means adapted to be positioned closely adjacent the delivery surface and being movable so as to spatter the slurry from to delivery surface onto the substrate;

recirculation means for allowing continuous flow of slurry upstream of the delivery surface; and regulation means for selectively varying or interrupting the flow of slurry from the delivery surface onto the substrate without interrupting the flow of slurry upstream of the delivery surface wherein the regulation means include a pair of barrier elements selectively movable to define an intermediate clearance space of variable effective cross-sectional flow area to thereby permit selective regulation of the flow rate of slurry from a reservoir, between the barrier elements, through an outlet, and to the delivery surface, the barrier elements being selectively adapted, in a closed configuration, to shut off flow between the reservoir and the delivery surface, a first barrier element comprising a first cylindrical roller rotatable about a first axis, a second barrier element comprising a second cylindrical roller rotatable about a second axis, parallel to the first, the first and second barrier elements configured to rotate in opposite directions, the first cylindrical roller having to form of a delivery drum, an outer surface of which constitutes the delivery surface, and the second roller having the form of a metering roller selectively movable toward, and away from, the delivery drum; and a first tank for containing a supply of the slurry and a delivery conduit for delivering the slurry from the tank to the reservoir through the inlet, wherein the reservoir is defined by a second tank positioned immediately above the delivery drum and the metering roller.

37. An apparatus for applying a slurry to a substrate, the apparatus comprising:

a delivery surface disposed to support a layer of slurry;

spattering means adapted to be positioned closely adjacent the delivery surface and being movable so as to spatter the slurry from the delivery surface onto the substrate;

recirculation means for allowing continuous flow of slurry upstream of the delivery surface; and regulation means for selectively varying or interrupting the flow of slurry from the delivery surface onto the substrate without interrupting the flow of slurry upstream of the delivery surface wherein the regulation means include a pair of barrier elements selectively movable to define an intermediate clearance space of variable effective cross-sectional flow area to thereby permit selective regulation of the flow rate of slurry from a reservoir, between the barrier elements, through an outlet, and to the delivery surface, the barrier elements being selectively adapted, in a closed configuration, to shut off flow between the reservoir and the delivery surface, a first barrier element comprising a delivery drum rotatable about a first axis and having an outer surface constituting the delivery surface, and a second barrier element comprising a metering roller rotatable about a second axis, parallel to the first axis, and selectively movable toward and away from the delivery drain, the delivery drum and the metering roller configured to rotate in opposite directions;

a tank for containing a supply of slurry and a delivery conduit for delivering the slurry from the tank to the reservoir through the inlet; and wherein the reservoir comprises a containment region defined between adjacent rollers, the containment region defined between the delivery drum and an abutting idler roller, with the metering roller being positioned above the delivery roller.

* * * * *